Mar. 13, 1923.

E. J. BRYANT.
ADJUSTABLE LIMIT GAUGE.
FILED MAY 22, 1920.

1,448,356.

Elmer J. Bryant
Inventor

By George Ramsey
Attorney

Patented Mar. 13, 1923.

1,448,356

UNITED STATES PATENT OFFICE.

ELMER J. BRYANT, OF WOONSOCKET, RHODE ISLAND, ASSIGNOR TO THE TAFT PEIRCE MANUFACTURING COMPANY, OF WOONSOCKET, RHODE ISLAND, A CORPORATION OF RHODE ISLAND.

ADJUSTABLE LIMIT GAUGE.

Application filed May 22, 1920. Serial No. 383,437.

*To all whom it may concern:*

Be it known that I, ELMER J. BRYANT, a citizen of the United States, and a resident of the city of Woonsocket, in the county of Providence, State of Rhode Island, have invented new and useful Improvements in Adjustable Limit Gauges, of which the following is a specification.

The present invention relates to limit gauges and more especially to adjustable limit gauges.

The principal object of the present invention is the provision in an adjustable limit gauge of an adjustable member carrying a gaging face, and adapted to be rigidly secured in position without danger of disturbing the set of the face during the locking of the face carrying member.

Another object of the present invention is the provision in an adjustable limit gauge of an adjustable member mounted on the body of the gauge and carrying one of the gauge faces, with locking means constructed in such manner that the locking forces are operative to prevent movement of the said member and these forces are directed in such manner as not to disturb the set of the gauge.

Another and important object of the present invention is a gauge of the character specified provided with a flat or table jaw mounted on a body portion and opposed by a movable jaw carried by the body portion with a clamping member operative tangentially on the movable jaw to lock the movable jaw in position.

Another and further object of the present invention is an external limit gauge which is provided with a table jaw mounted on a body portion of the gauge and a threaded movable jaw carried by the body portion and opposite to the table jaw with a threaded locking member adapted to apply locking forces at right-angles to the line of movement of the movable jaw whereby the adjustment of the jaw is not disturbed when the locking member is set.

Another and specific object of the present invention is an external limit gauge provided with an adjustable jaw and locking means for the adjustable jaw with the locking means movable at right-angles to the movement of the adjustable jaw whereby the effective locking forces are at right-angles to the movement of the adjustable jaw.

Another object of the present invention is an external limit gauge provided with a pair of jaws connected by means of the body portion, with the jaws relatively thick and the body portion comprising a relatively thin web, a flange at the edge of the body portion between the jaws and connecting the jaw members, and with hand-hold extension pads on the body portion opposite to the opening between the jaws; said hand-hold extension pads being of substantially the same thickness as the jaws whereby when said gauge is lying on a side one of said pads and said jaws comprise the support for the gauge.

Another and important object of the present invention is an external limit gauge of the adjustable type comprising a rigid jaw and a cylindrical member having movement at substantially right-angles to said jaw with the said member being seated in a cylindrical opening in such manner as to provide a cup above the upper end of said member when the member is in position whereby said gauge may be sealed after being adjusted in order to prevent accidental or intentional movement of the member by an unauthorized person.

Other and further objects of the present invention will in part be obvious and will in part be pointed out hereinafter in the specification following wherein like parts are indicated by like characters throughout the several figures of the drawings.

Realizing that the present inventions may be embodied in constructions other than those specifically shown and described it is desired that the disclosure herewith shall be understood as illustrative and not be taken in the limiting sense.

Figure 1:
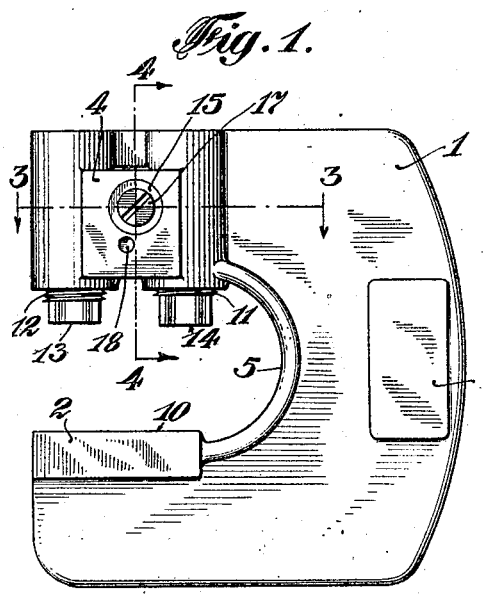
Figure 1 is an elevational view of the device.
Figure 2:
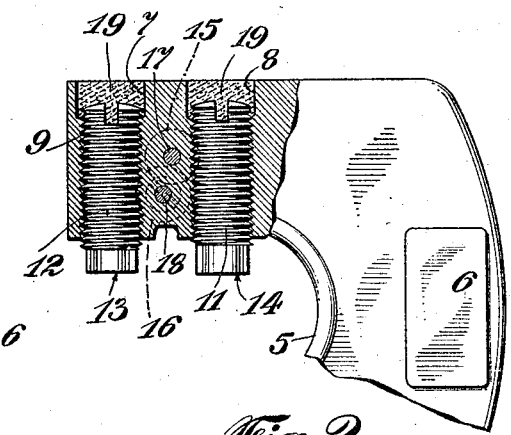
Figure 2 is a view showing a section through the adjustable jaw portions.
Figure 3:
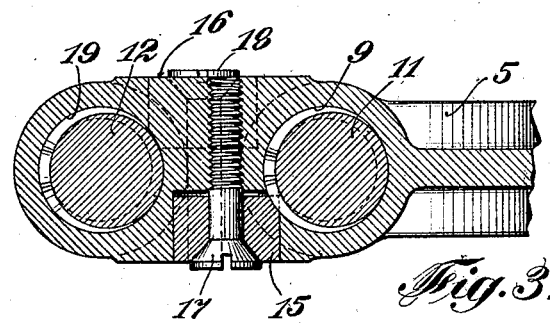
Figure 3 is a sectional plan view of an enlarged detail taken on line 3—3 of Figure 1.
Figure 4:
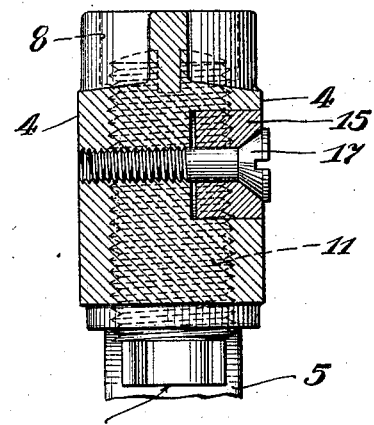
Figure 4 is a view taken on line 4—4 of Figure 1.

Heretofore in the art of adjustable gauges the most common type have been those having movable jaws connected by a hinged mounting similar to that of a pair of hinged calipers; another common type has the jaws made independently and connected together in such manner as to slide one upon the other whereby the distance between the gauge faces could be adjusted by a rectilineal movement. In both of these types in the prior art there has been a lack of rigidity which is essential to the "feel" of the gauge and in both of the types specified there was great liability of parts springing so that such gauges could not be relied upon for accurate work. There has also been a type of gauge in the prior art wherein the jaws have been made in the form of screw-threaded cylindrical members passing through body portions with the gauge heads on the end of the screw-threaded members and with the screw-threaded members held in position by means of lock nuts or other constructions applying forces in the direction of the line of adjustment of the gauge face. In these devices difficulty has been encountered in locking the gauge faces after the required adjustment has been made, because the locking forces operate in the same direction as the adjustments and consequently the locking forces disturb the accuracy of the adjustments made. It is also desirable that adjustable gauges when used for large production work, shall be set by an inspector and then sealed so that unauthorized persons cannot change the gauge setting. The types of gauges specified cannot readily be sealed without considerable trouble so that there has been a tendency to slackness in the matter of sealing where the foregoing specified types of gauges are used.

The gauge comprising the present invention overcomes the difficulties of the known art by providing a very rigid construction with the adjustable jaw faces capable of being locked securely in position without disturbing the set of the gauge and the parts when adjusted are capable of being sealed with a minimum amount of effort and trouble.

One embodiment of the present invention in its broad form comprises a body portion provided with jaws one of which may carry a cylindrical member movable relatively to the jaws and being provided on its one end with a gauge face, and a clamping device constructed to tightly clamp the member in the gauge by forces which act at right-angles to the movement of the member and with the body of the gauge being provided with a cup above the member so that sealing material may readily be poured into the cup and seal the adjustable jaw in position.

Referring now more specially to the drawings, the embodiment wherein the invention is herewith illustrated comprises a gauge member having a body portion 1 which is in the form of a web that extends between a pair of pads or jaws 2 and 4 and with a flange 5 at the inner edge of the body portion and connecting the pads 2 and 4. The body portion web opposite the flange 5 is provided with a pair of hand-hold extension pads 6 which are convenient for holding the gauge and are of such construction as to dissipate the heat from the hand of the user. The several pads 2, 4, and 6 are substantially coplanar on both sides of the gauge, and therefore comprise supports for the gauge when it is not in use. From the foregoing description of the body portion it is evident that the gauge is an extremely rigid solid construction.

Figure 5:
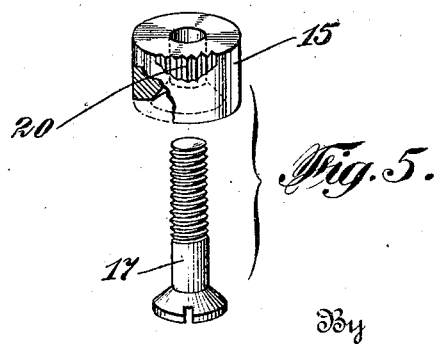
Figure 5 is a detail view of the locking screw and washer.

The pad 4 preferably terminates in a pair of cylindrical cups 7 and 8 from which extend screw-threaded openings 9 with the axis of all these openings at right-angles to the gauge face 10 on the pad 2. Accurately fitted cylindrical screw plugs 11 and 12 are adapted to extend through the screw-threaded openings 9 and are provided on their inner ends with gauge faces 13 and 14. These screw-threaded members may be adjusted toward or from the gauge face 10 and be set to predetermined dimensions and preferably in such manner that the gauge face 13 defines the "go" dimension and gauge face 14 limits the "not go" dimension. Cylindrical recesses at right-angles to the openings 9 are provided on opposite sides of the pad 4 with these recesses slightly out of alignment and leading into the threaded openings 9. One of these recesses is adapted to carry a collar 15 which is intended to cooperate with the cylindrical plug 11, and the other carries a collar 16 that is adapted to cooperate with the cylindrical plug 12. Conically headed screws 17 and 18 pass through the collars 15 and 16 respectively and are screw-threaded into the body portion of the gauge. In the manufacture of the gauge the collars 15 and 16 are set in the recesses upon suitable washers or other spacing means so that the collars are not seated in the bottom of the recesses and as the openings 9 are screw-threaded the tap also screw-threads the portion of the collar that extends into or forms a part of the wall of the opening 9, as is clearly indicated in Figure 5. This screw-threaded portion of the collars 15 and 16 is adapted to engage with the cylindrical plugs 11 and 12 so that when the screws 17 and 18 are tightened the screw-threaded portions of the collars 15 and 16 are clamped against the cylindrical plugs 11 and 12. It is to be noted that the clamp forces are at right-angles to the line of movement of the cylindrical plugs and consequently do not disturb the adjustment of these members when the locking collars are set. Furthermore it will be noted that the collars 15 and 16 tightly fit the openings through the body portion so that the distribution of forces is such that there is no lateral movement and no tendency for the gauge to be distorted due to the clamping pressure. The conical portion of the screws 17 and 18 set against conical portions of the clamping washers and consequently the pressures are well distributed. It will be noted that the measuring plugs or studs are well seated within the cups 7 so that sealing material such as sealing wax 19 may be run into these cups to fill same and securely seal the gauge.

The above described construction provides a very rigid gauge, which possesses all the advantages of a solid gauge and at the same time provides the desirable feature of adjustability.

Having thus described my invention, what I claim is:

1. A gauge comprising in combination a body portion provided with a cup, said body portion having a screw-threaded opening, an adjustable screw-threaded gauge member having a gauge face thereon and carried by said body portion and extending into said cup, said body portion being provided with a cylindrical opening, the axis of which is at right-angles to the movement of said member, a clamping device comprising a clamp ring extending into said opening and having a threaded face in engagement with said member, and a binding screw for applying forces to said clamp ring with said forces acting at right-angles to said gauge member to lock the said member against movement relatively to said body portion, said cup being adapted to receive and contain sealing material to seal said adjustable member in locked position.

2. A gauge comprising in combination a body portion provided with a cup, said body portion having a screw threaded opening, an adjustable screw threaded gauge member having a gauge face thereon and carried by said body portion and extending into said cup, said body portion being provided with a cylindrical opening, the axis of which is at right-angles to the movement of said member, a clamping device extending into said opening and having a threaded face in engagement with said member, a binding screw for applying forces to said clamping device with said forces acting at right-angles to said gauge member to lock the said member against movement relatively to said body portion, said cup being adapted to receive and contain sealing material to seal said adjustable member in locked position.

3. A gauge comprising in combination a body portion, said body portion having a screw threaded opening, an adjustable screw threaded gauge member having a gauge face thereon and carried by said body portion, said body portion being provided with a cylindrical opening, the axis of which is at right angles to the movement of said member, a clamping device comprising a clamp ring extending into said opening and having a threaded face in engagement with said member, and a binding screw for applying forces to said clamp ring with said forces acting at right-angles to said gauge member to lock the said member against movement relatively to said body portion.

4. A gauge comprising in combination a body portion, said body portion having a screw threaded opening, an adjustable screw threaded gauge member having a gauge face thereon and carried by said body portion, said body portion being provided with a cylindrical opening the axis of which is at right-angles to the movement of said member, a non-rotatable clamping device extending into said opening and having a threaded face in engagement with said member, and means for applying forces to said clamping device with said forces acting at right-angles to said gauge member to lock the said member against movement relatively to said body portion.

5. A gauge comprising in combination a body portion, an adjustable gauge member having a gauge face thereon and carried by said body portion, said body portion being provided with a cylindrical opening the axis of which is at right-angles to the movement of said member, a clamping device having screw threads on a portion thereof and extending into said opening and into engagement with said member, and means for applying forces to said clamping device with said forces acting at right-angles to said gauge member to lock the said member against movement relatively to said body portion.

6. A gauge comprising a body portion, an extension from said body portion, an adjustable member provided with a gauge face and mounted on said extension and being in screw threaded relation thereto to permit said member to be adjusted, locking means for said member, said locking means comprising a clamp having a screw threaded face movable at right angles to the movement of said member.

7. A gauge comprising a body portion, provided with a cup, an adjustable member provided with a gauge face and mounted on said body portion and being in screw threaded relation thereto to permit said member to be adjusted relative to said body portion, and locking means for said member, said cup being of a larger diameter than the diameter of said adjustable member and being adapted to be filled with sealing material to seal the adjustable member in locked position.

8. An adjustable gauge comprising a body portion, a gauge plug screw threaded through said body portion for adjustment, said body portion being provided with an opening adjacent said plug, a washer fitted in said opening and provided with a conical bore in the outer end of said washer, said washer having a screw threaded face in engagement with said plug, a binding screw extending through said washer and being provided with a conical head adapted to fit said bore whereby said plug may be clamped in position by means of said washer.

ELMER J. BRYANT.